(12) United States Patent
Kimura

(10) Patent No.: US 6,762,740 B1
(45) Date of Patent: Jul. 13, 2004

(54) APPARATUS FOR LIGHTING A DISPLAY IN A COLOR DEPENDENT ON INFORMATION AND METHOD THEREFOR

(75) Inventor: Etsuko Kimura, Saitama (JP)

(73) Assignee: NEC Corporation, Tokyo (JP)

( * ) Notice: Subject to any disclaimer, the term of this patent is extended or adjusted under 35 U.S.C. 154(b) by 318 days.

(21) Appl. No.: 09/656,752

(22) Filed: Sep. 7, 2000

(30) Foreign Application Priority Data

Sep. 14, 1999 (JP) .......................................... 11/259677

(51) Int. Cl.[7] ................................................ G09G 3/36
(52) U.S. Cl. ...................... 345/102; 345/170; 345/593; 345/426; 340/7.55; 340/7.57; 340/7.61; 340/393.3; 379/29.1; 379/88.11; 379/374.01; 455/566
(58) Field of Search ................................ 345/426, 593, 345/170; 379/29.1, 88.11, 374.01; 340/7.61, 7.55, 7.2, 393.3, 7.57

(56) References Cited

U.S. PATENT DOCUMENTS

| | | | | |
|---|---|---|---|---|
| 6,097,935 A | * | 8/2000 | Takahashi et al. | ........ 455/186.1 |
| 6,348,855 B1 | * | 2/2002 | Ishiguro | .................... 340/7.52 |
| 6,411,198 B1 | * | 6/2002 | Hirai et al. | .................. 340/7.6 |

FOREIGN PATENT DOCUMENTS

| | | | |
|---|---|---|---|
| JP | 5-37620 | | 2/1993 |
| JP | 6-37715 | | 2/1994 |
| JP | 06-037715 | * | 2/1994 |
| JP | 6-204910 | | 7/1994 |
| JP | 07-154461 | * | 6/1995 ............ H04M/1/22 |
| JP | 9-191491 | | 7/1997 |
| JP | 09-284848 | | 10/1997 |
| JP | 10-145475 | | 5/1998 |
| JP | 11-146042 | | 5/1999 |
| JP | 11-243439 | | 9/1999 |

OTHER PUBLICATIONS

Japenese Office Action dated Jan. 21, 2003 with partial translation.

* cited by examiner

Primary Examiner—Matthew C. Bella
Assistant Examiner—Antonio Caschera
(74) Attorney, Agent, or Firm—McGinn & Gibb, PLLC

(57) ABSTRACT

A display lighting apparatus is disclosed, that comprises a first storing means for storing date information, a second storing means for storing color information correlated with the date information, a displaying means for displaying information, a lighting means for lighting said displaying means, and a controlling means for searching said first storing means for input date information, and when desired date information is obtained, reading color information correlated with the date information from said second storing means, and causing said lighting means to light corresponding to the color information.

28 Claims, 6 Drawing Sheets

F I G. 3

| INCOMING INCOMING CALL RECEIVING STATE | : COLOR LIGHTING ON |
|---|---|
| STANDBY STATE | : COLOR LIGHTING ON |
| COMMUNICATING STATE | : COLOR LIGHTING ON |
| RINGING TONE COMPOSING | : COLOR LIGHTING ON |
| FUNCTION SETUP | : COLOR LIGHTING ON |
| SCHEDULE FUNCTION | : COLOR LIGHTING ON |
| ANNIVERSARY FUNCTION | : COLOR LIGHTING ON |
| CALENDAR FUNCTION | : COLOR LIGHTING ON |
| LOW VOLTAGE ALARM FUNCTION | : COLOR LIGHTING ON |
| SHORT MAIL COLOR TRANSMITTING FUNCTION | : COLOR LIGHTING ON |
| MEMORY DESIGNATED INCOMING CALL ACCEPTING FUNCTION | : COLOR LIGHTING ON |
| WAKEUP FUNCTION | : COLOR LIGHTING ON |
| CLOCK ALARM FUNCTION | : COLOR LIGHTING ON |

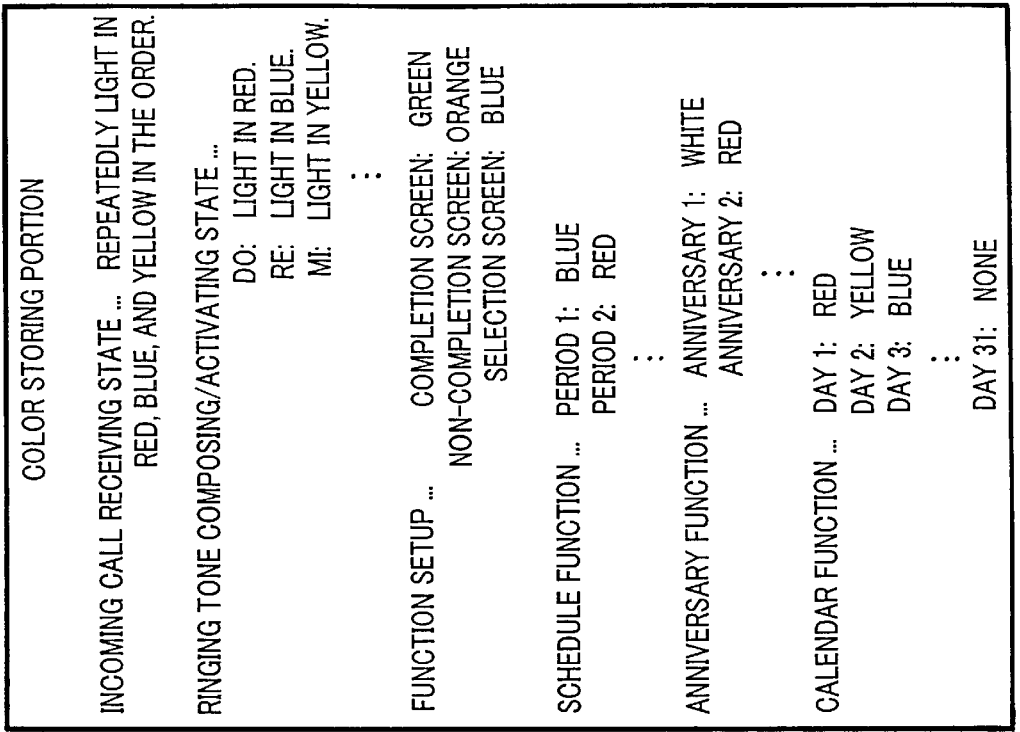
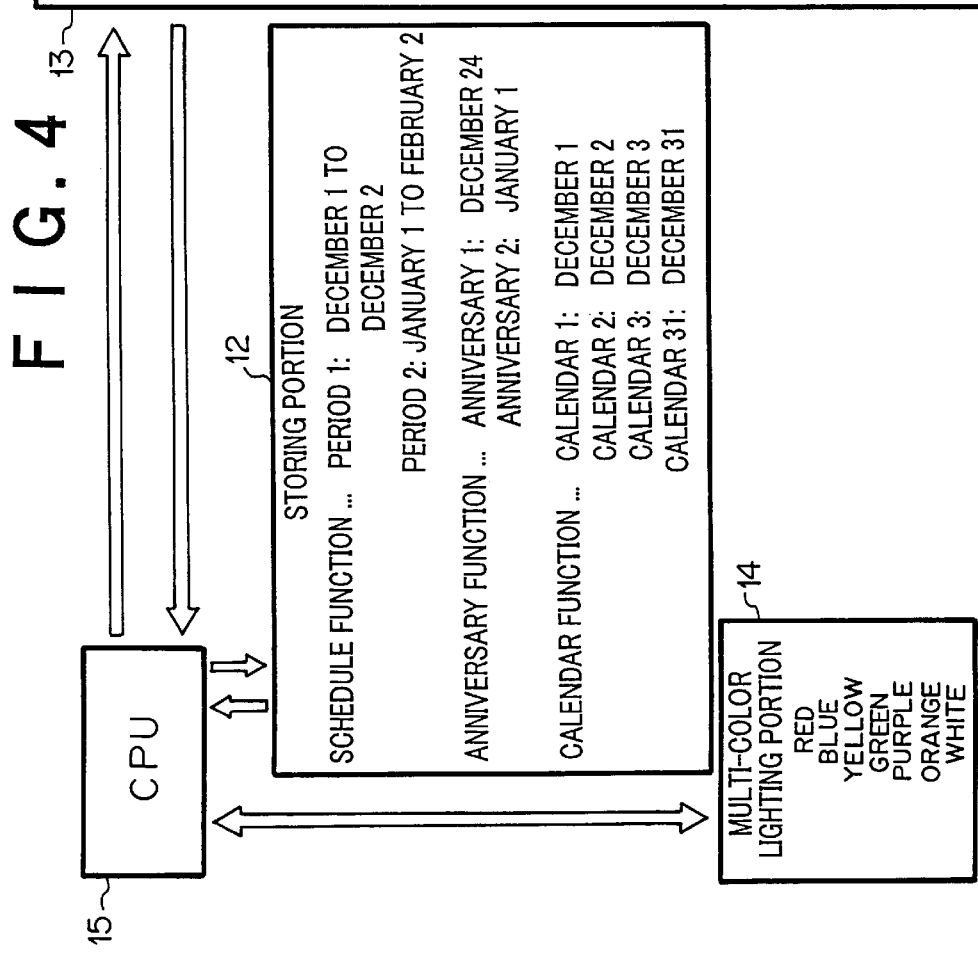
FIG. 4

APPARATUS FOR LIGHTING A DISPLAY IN A COLOR DEPENDENT ON INFORMATION AND METHOD THEREFOR

BACKGROUND OF THE INVENTION

1. Field of the Invention

The present invention relates to a display lighting apparatus and a display lighting method and in particular, to a display lighting apparatus and a display lighting method for use with a portable telephone.

2. Description of the Related Art

A conventional portable telephone unit notifies the user of information using a combination of a display, a sound, and a mono-color (or two-color) light. Such a conventional portable telephone unit operates as follows: When the portable telephone unit receives an incoming call, the portable telephone unit blinks the display (LCD: Liquid Crystal Display), generates a ringing tone or activates a vibrator. When the battery of the portable telephone unit almost runs out, it lights the display, generates an alarm sound, and displays a "low power" message on the display. When the portable telephone unit notifies the user of his or her incorrect operation, the unit generates an alarm sound and displays an "incorrect operation" message on the display.

However, such a related art technology has the following disadvantages. As a first disadvantage, since characters on the display and keys are small and illegible, the user cannot easily read them. This is because as a portable telephone unit becomes small, characters on the display and keys become small.

As a second disadvantage, the user tends to mistakenly operate the portable telephone unit. As with the same reason of the first disadvantage, since the user cannot easily read the characters on the display and keys, he or she tends to mistakenly press keys.

To allow the user to easily read characters on the LCD, a technology in which colors of the backlight of the LCD are added as display information along with characters and sounds has been disclosed in JPA 6-37715 (hereinafter referred to as first related art reference), JPA 5-37620 (hereinafter referred to as second related art reference), JPA 6-204910 (hereinafter referred to as third related art reference), JPA 9-191491 (hereinafter referred to as fourth related art reference), and JPA 10-145475 (hereinafter referred to as fifth related art reference).

According to the first related art reference, when the portable telephone unit is in the standby state, the unit causes the backlight to shut off. When the portable telephone unit transmits an originating call, the unit causes the backlight to blink in green. When the portable telephone unit is in the communicating state, the unit causes the backlight to light in green. When the portable telephone unit is performing an abnormal process, the unit causes the backlight to blink in red. According to the second related art reference, the portable telephone unit notifies the user of a setup time using the color of the backlight. The third related art reference has disclosed the same technology as the first related art reference. According to the fourth related art reference, the portable telephone unit notifies the user of whether the current communicating mode is a cellular mode or a PHS (Personal Handy phone System that is being serviced in Japan) using different colors of the backlight. According to the fifth related art reference, the portable telephone unit causes the color of the backlight to vary corresponding to the battery level and depending on whether the telephone number of an incoming call has been registered in the memory.

The technology in which the color of the backlight is varied depending on each state is known as explained above. Although recent portable telephone units have a schedule function, a calendar function, and so forth, they have not disclosed a technology in which the color of the backlight is varied corresponding to such functions.

SUMMARY OF THE INVENTION

An object of the present invention is to provide a display lighting apparatus and a display lighting method that allow the color of the backlight to be varied corresponding to a schedule function (of an action schedule table or the like), a calendar function, and so forth.

To solve the above-explained problem, a first aspect of the present invention is a display lighting apparatus, comprising a first storing means for storing date information, a second storing means for storing color information correlated with the date information, a displaying means for displaying information, a lighting means for lighting said displaying means, and a controlling means for searching said first storing means for input date information, and when desired date information is obtained, reading color information correlated with the date information from said second storing means, and causing said lighting means to light corresponding to the color information.

A second aspect of the present invention is a display lighting apparatus, comprising a first storing means for storing key operation information, a second storing means for storing color information correlated with the key operation information, a displaying means for displaying information, a lighting means for lighting said displaying means, and a controlling means for searching said first storing means for input key operation information, and when desired key operation information is obtained, reading color information correlated with the key operation information from said second storing means, and causing said lighting means to light corresponding to the color information.

A third aspect of the present invention is a display lighting apparatus, comprising a first storing means for storing screen information, a second storing means for storing color information correlated with the screen information, a displaying means for displaying information, a lighting means for lighting said displaying means, and a controlling means for searching said first storing means for screen information displayed on said displaying means, and when desired screen information is obtained, reading color information correlated with the screen information from said second storing means, and causing said lighting means to light corresponding to the color information.

A fourth aspect of the present invention is a display lighting apparatus, comprising a first storing means for storing predetermined reception information, a second storing means for storing color information correlated with the reception information, a displaying means for displaying information, a lighting means for lighting said displaying means, and a controlling means for searching said first storing means for reception information, and when desired reception information is obtained, reading color information correlated with the reception information from said second storing means, and causing said lighting means to light corresponding to the color information.

A fifth aspect of the present invention is a display lighting method of a display lighting apparatus having a first storing means for storing date information, a second storing means for storing color information correlated with the date information, a displaying means for displaying information, and a lighting means for lighting the displaying means, the method comprising the steps of searching the first storing means for input date information, and when desired date information is obtained, reading color information correlated with the date information from the second storing means, and causing the lighting means to light corresponding to the color information.

A sixth aspect of the present invention is a display lighting method of a display lighting apparatus having a first storing means for storing key operation information, a second storing means for storing color information correlated with the key operation information, a displaying means for displaying information, and a lighting means for lighting the displaying means, the method comprising the steps of searching the first storing means for input key operation information, and when desired key operation information is obtained, reading color information correlated with the key operation information from the second storing means, and causing the lighting means to light corresponding to the color information.

A seventh aspect of the present invention is a display lighting method of a display lighting apparatus having a first storing means for storing screen information, a second storing means for storing color information correlated with the screen information, a displaying means for displaying information, and a lighting means for lighting the displaying means, the method comprising the steps of searching the first storing means for screen information displayed on the displaying means, and when desired screen information is obtained, reading color information correlated with the screen information from the second storing means, and causing the lighting means to light corresponding to the color information.

An eighth aspect of the present invention is a display lighting method of a display lighting apparatus having a first storing means for storing predetermined reception information, a second storing means for storing color information correlated with the reception information, a displaying means for displaying information, and a lighting means for lighting the displaying means, the method comprising the steps of searching the first storing means for reception information, and when desired reception information is obtained, reading color information correlated with the reception information from the second storing means, and causing the lighting means to light corresponding to the color information.

According to the first to eighth aspects of the present invention, a controlling means causes a lighting means to light in a color corresponding to function information stored in a first storing means and to color information correlated with the function information and stored in a second storing means, a technology of which the color of the backlight is varied corresponding to the schedule function (of such as action schedule table), the calendar function, and so forth can be applied.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a table showing information stored in a storing portion;

FIG. 4 is a detailed schematic diagram showing the structure of the display lighting apparatus;

DESCRIPTION OF PREFERRED EMBODIMENTS

Beset Mode of Present Invention

Figure 1:
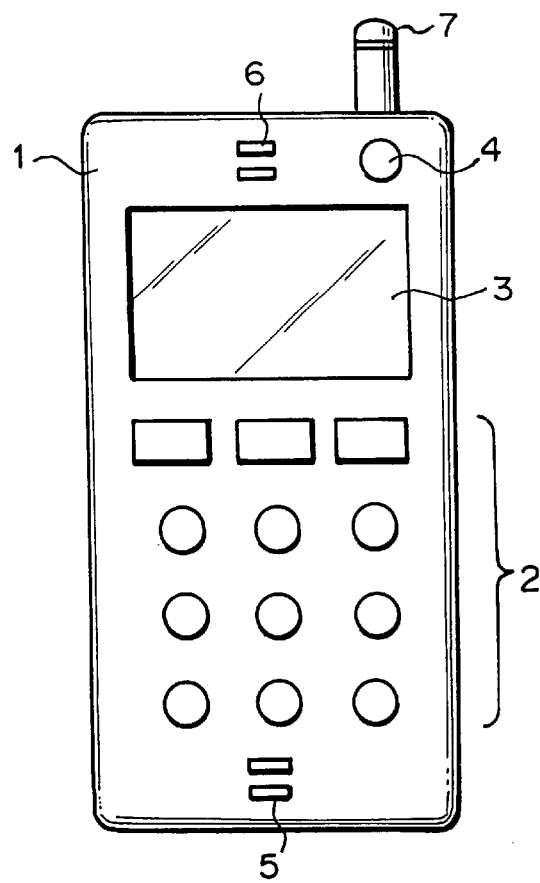
FIG. 1 is an external view showing the structure of a portable telephone unit using a display lighting apparatus according to the best mode of the present invention.

Next, with reference to the accompanying drawings, the best mode of the present invention will be explained. FIG. 1 is an external view showing the structure of a portable telephone unit using a display lighting apparatus according to the best mode of the present invention. Referring to FIG. 1, a main body 1 of the portable telephone unit has a key input portion 2, an LCD portion 3, an LED (Light Emitting Diode) indicator 4, a microphone 5, a speaker 6, and an antenna 7. The key input portion 2 has numeric keys and function keys. A backlight (not shown) is disposed in the main body 1. The backlight causes the key input portion 2 and the LCD portion 3 to light from the rear. According to the present invention, the color of the backlight is varied corresponding to each function.

The LED indicator 4 indicates individual functions with different colors. When the main body 1 has the backlight that lights at least the key input portion 2 or the LCD portion 3 from the rear, the LED indicator 4 can be omitted. In other words, the LED indicator 4 is used for a portable telephone unit that does not have the backlight. As an example, the main body 1 shown in FIG. 1 has both the LCD portion 3 and the LED indicator 4. The backlight lights in, for example, seven colors that are red, blue, yellow, green, purple, orange, and white. As with the LCD portion 3, the LED indicator 4 lights in seven colors.

Figure 2:
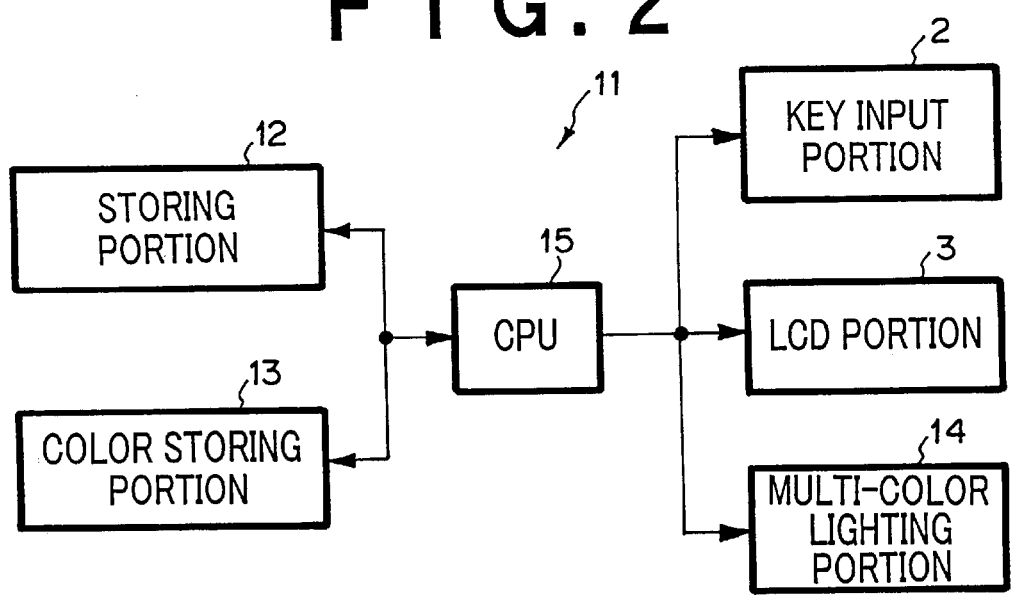
FIG. 2 is a schematic diagram showing the structure of the display lighting apparatus for use with the portable telephone unit.

FIG. 2 shows the structure of the display lighting apparatus for use with the portable telephone unit. For simplicity, in FIG. 2, similar portions to those in FIG. 1 are denoted by similar reference numerals and their description is omitted. Referring to FIG. 2, a display lighting apparatus 11 comprises a storing portion 12, a color storing portion 13, the key input portion 2, the LCD portion 3, a multi-color lighting portion (the above-mentioned backlight) 14, and a CPU (Central Processing Unit) 15. The CPU 15 controls the storing portion 12, the color storing portion 13, the key input portion 2, the LCD portion 3, and the multi-color lighting portion 14.

The storing portion 12 stores function information. The color storing portion 13 stores color information of lighting corresponding to the function information stored in the storing portion 12. The key input portion 2 allows the user to input a telephone number and function information. The LCD portion 3 displays a telephone number, a function, and other information. The multi-color lighting portion 14 causes the key input portion 2 and the LCD portion 3 to light from the rear.

For example, the storing portion 12 has stored information of dates from "December 1" to "December 2" as information of period 1 for a schedule function of such as an action schedule table. On the other hand, the color storing portion 13 has stored information "blue" corresponding to the dates from "December 1" to "December 2". When the user inputs the dates from "December 1" to "December 2" for the schedule function with the key input portion 2 or places the cursor at the dates from "December 1" to "December 2" displayed for the schedule function on the LCD portion 3, the CPU 15 reads the information of the dates from "December 1" to "December 2" as information of period 1 from the storing portion 12. Thereafter, the CPU 15 reads information corresponding to the dates (namely, information "blue") from the color storing portion 13. Thus, the CPU 15 causes the multi-color lighting portion 14 to light in blue. As a result, the key input portion 2 and the LCD portion 3 light in blue.

Thus, the user can intuitively know that the dates from "December 1" to "December 2" are displayed on the LCD portion 3 with the key input portion 2 and the LCD portion 3 that light in blue without need to read characters on the LCD portion 3. Thus, even if characters displayed on the LCD portion 3 are small and illegible, the user can accurately know the information.

Now, it is assumed that the portable telephone unit has a music composing function using the keys and that the keys "1", "2", and "3" have been assigned to "DO", "RE", and "MI" of the musical scales, respectively. The storing portion 12 has stored information of the keys "1", "2", and "3" as the music composing function. On the other hand, the color storing portion 13 has stored information "red", "blue", and "yellow" corresponding to the keys "1", "2", and "3", respectively. When user inputs the key "1" for the music composing function from the key input portion 2, the CPU 15 reads the information of the key "1" from the storing portion 12 corresponding to the key information that has been input from the key input portion 2. Thereafter, the CPU 15 reads information corresponding to the information of the key "1" (namely, the information "red") from the color storing portion 13. Thus, the CPU 15 causes the multi-color lighting portion 14 to light in red. As a result, the key input portion 2 and the LCD portion 3 light in red. Likewise, the CPU 15 causes the multi-color lighting portion 14 to light in blue and yellow corresponding to the information of the keys "2" and "3", respectively.

Thus, the user can check that he or she has pressed the keys "1", "2", and "3" with reference to the color (red, blue, and yellow) of the lighting of the key input portion 2 and the LCD portion 3, respectively. Thus, the user can be prevented from mistakenly pressing keys.

According to the best mode of the present invention, the multi-color lighting portion 14 causes the key input portion 2 and the LCD portion 3 to light. Alternatively, when the multi-color lighting portion 14 causes either the key input portion 2 or the LCD portion 3 to light, the object of the present invention can be accomplished. When the display portion is composed of an LED or the like instead of an LCD, the multi-color lighting portion 14 is the LED indicator 4. Since the operation of the LED indicator 4 is the same as the multi-color lighting portion 14, the operation thereof is omitted.

First to Third Embodiments of Present Invention

Next, the embodiments of the present invention will be explained. In the following explanation, since the structure of the portable telephone unit and the structure of the display lighting apparatus are the same as those of the best mode of the present invention shown in FIGS. 1 and 2, the following embodiments will be explained with reference to FIGS. 1 and 2. FIG. 3 is a table showing information stored in the storing portion 12. With reference to FIG. 3, the left field and the right field of the table represent individual functions and information of "color lighting on", respectively. In other words, the storing portion 12 has correlatively stored the individual functions and the information of "color lighting on". "Color lighting on" causes the multi-color lighting portion 14 to light in a predetermined color corresponding to a particular function. In addition, the storing portion 12 has stored information of period 1 for the above-explained schedule function, information of the keys "1", "2", and "3" for the music composing function, and so forth (not shown).

FIG. 4 is a block diagram showing the detailed structure of the display lighting apparatus. Referring to FIG. 4, the boxes of the storing portion 12, the color storing portion 13, and the multi-color lighting portion 14 contain information that they handle.

Figure 5:
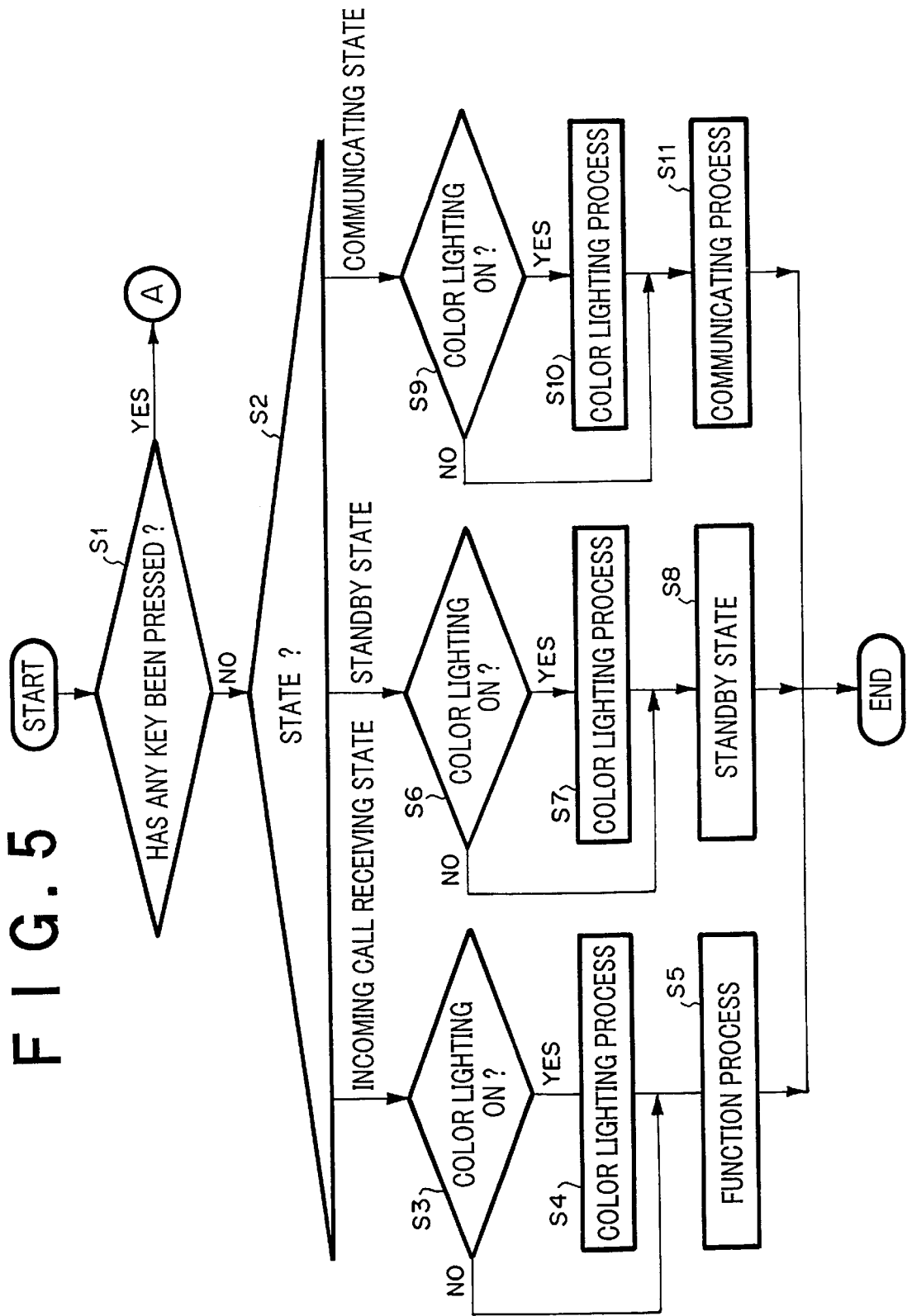
FIG. 5 is a flow chart showing operations of first to third embodiments of the present invention.

FIG. 5 is a flow chart showing the operations of the first to third embodiments of the present invention. With reference to FIG. 5, the CPU 15 determines whether or not a key has been pressed with the key input portion 2 (at step S1). When any key has not been pressed (namely, the determined result at step S1 is N), the CPU 15 checks for the state of the portable telephone unit 1 (at step S2). When the portable telephone unit 1 is in the incoming call receiving state, the CPU 15 performs the following operation as the first embodiment.

First Embodiment

The CPU 15 references the storing portion 12 and determines whether or not the incoming call receiving state has been designated to "color lighting on". According to the first embodiment, since the incoming call receiving state has been designated to "color lighting on" (namely, the determined result at step S3 is Y), the CPU 15 references the color storing portion 13. The color storing portion 13 has stored information that causes the multi-color lighting portion 14 to repeatedly light in red, blue, and yellow in the order (see FIG. 4). Thus, the CPU 15 causes the multi-color lighting portion 14 to repeatedly light in red, blue, and yellow in the order (at step S4). As a result, the key input portion 2 and the LCD portion 3 repeatedly light in red, blue, and yellow in the order. Thereafter, the CPU 15 executes a ringer sound generating process for the incoming call receiving process (at step S5). On the other hand, when the incoming call receiving state has not been designated to "color lighting on" (namely, the determined result at step S3 is N), the flow advances to step S5 (function process) skipping step S4 (color lighting process).

The color storing portion 13 may have stored information that causes the multi-color lighting portion 14 to light in for example green in the incoming call receiving state. Thus, in the incoming call receiving state, the multi-color lighting portion 14 lights in green.

Second Embodiment

Next, the second embodiment of the present invention will be explained. Since the processes at steps S1 and S2 of the second embodiment are the same as those of the first embodiment, their description is omitted. When the portable telephone unit 1 is in the standby state, the CPU 15 references the storing portion 12 and determines whether or not the standby state has been designated to "color lighting on". According to the second embodiment, since the standby state has been designated to "color lighting on" (namely, the determined result at step S6 is Y), the CPU 15 references the color storing portion 13. The color storing portion 13 has stored information "green" as lighting in the standby state. Thus, the CPU 15 causes the multi-color lighting portion 14 to light in green (at step S7). As a result, the key input portion 2 and the LCD portion 3 light in green. Thereafter, the CPU 15 executes the process of the standby state function (at step S8). On the Other hand, when the standby state has not been designated to "color lighting on" (namely, the determined result at step S6 is N), the flow advances to step S8 (standby process) skipping step S7 (color lighting process).

Third Embodiment

Next, the third embodiment of the present invention will be explained. Since the processes at steps S1 and S2 of the third embodiment are the same as those of the first embodiment, their description is omitted. When the portable telephone unit 1 is in the communicating state, the CPU 15 references the storing portion 12 and determines whether or not the communicating state has been designated to "color lighting on". According to the third embodiment, since the communicating state has been designated to "color lighting on" (namely, the determined result at step S9 is Y), the CPU 15 references to the color storing portion 13. The color storing portion 13 has stored information "purple" as lighting in the communicating state. Thus, the CPU 15 causes the multi-color lighting portion 14 to light in purple (at step S10). As a result, the key input portion 2 and the LCD portion 3 light in purple. Thereafter, the CPU 15 executes the process of the communicating function (at step S11). On the other hand, when the standby state has not been designated to "color lighting on" at step S9 (namely, the determined result at step S9 is N), the flow advances to step S11 (communicating process) skipping step S10 (color lighting process).

Fourth to Eighth Embodiments of Present Invention

Figure 6:
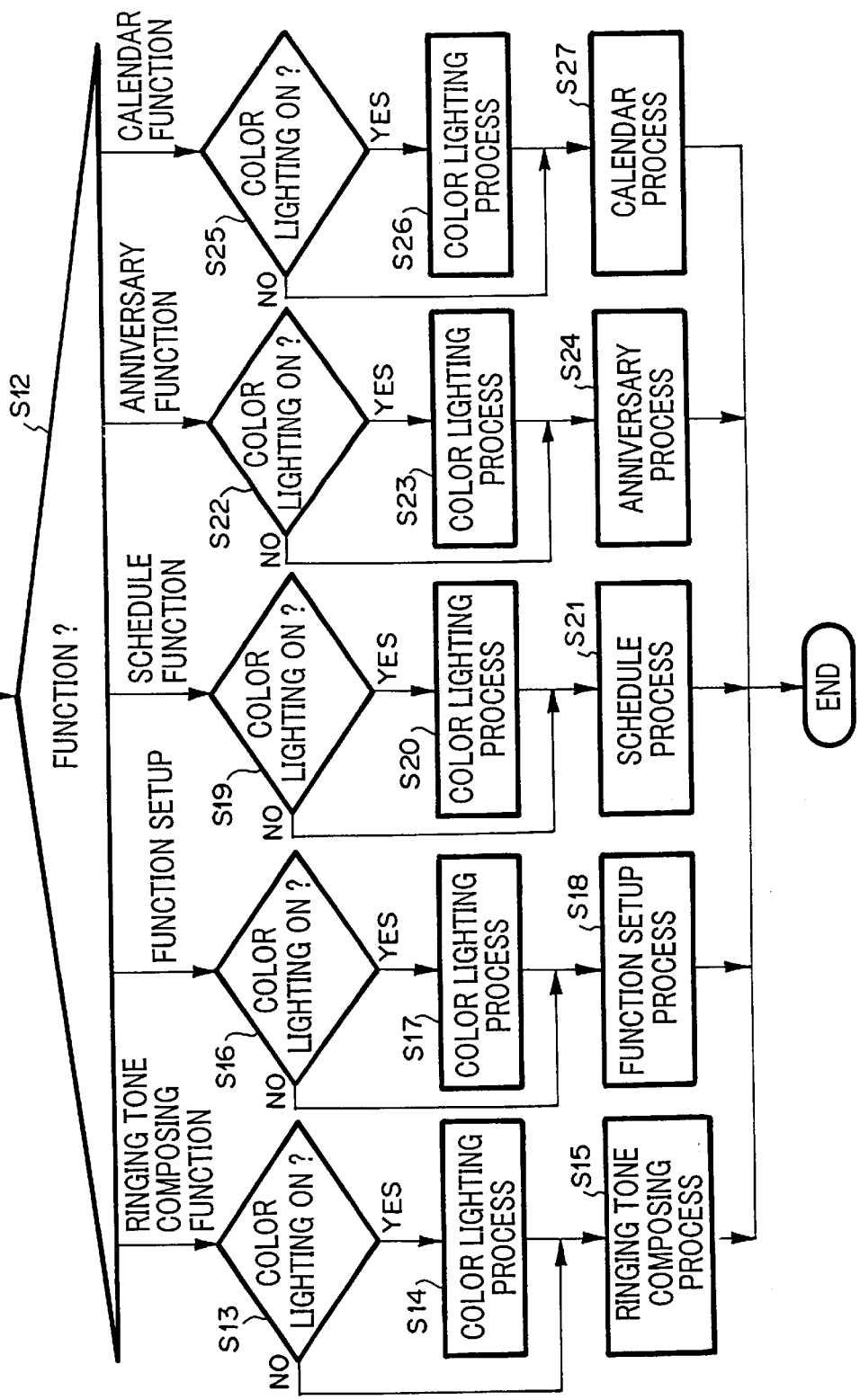
FIG. 6 is a flow chart showing operations of fourth to eighth embodiments of the present invention.

The fourth to eighth embodiments of the present invention are operations of the CPU 15 in the case that any key has been pressed with the key input portion 2 at step S1 (namely, the determined result at step S1 is Y). FIG. 6 is a flow chart showing the operations of the fourth to eighth embodiment of the present invention.

Fourth Embodiment

Next, the fourth embodiment of the present invention will be explained. The CPU 15 checks for the function of the key that has been pressed (at step S12). When the pressed key is a key assigned to a ringing tone composing function, the CPU 15 references the storing portion 12 and determines whether or not the ringing tone composing function has been designated to "color lighting on". According to the fourth embodiment, since the ringing tone composing function has been designated to "color lighting on" (namely, the determined result at step S13 is Y), the CPU 15 references the color storing portion 13. The color storing portion 13 has stored information that correlates the musical scales of the ringing tone composing/activating state and lighting colors (see FIG. 4). Referring to FIG. 4, the color storing portion 13 has stored information that causes the multicolor lighting portion 14 to light in red, blue, or yellow when the pressed key is a key assigned to "DO", "RE", or "MI" of the musical scales, respectively. Thus, when the pressed key is a key assigned to "DO" of the musical scale, the CPU 15 causes the multi-color lighting portion 14 to light in red. When the pressed key is a key assigned to "RE" of the musical scale, the CPU 15 causes the multi-color lighting portion 14 to light in blue. When the pressed key is a key assigned to "MI" of the musical scale, the CPU 15 causes the multi-color lighting portion 14 to light in yellow (at step S14). As a result, when the pressed key is a key assigned to "DO" of the musical scale, the key input portion 2 and the LCD portion 3 light in red. When the pressed key is a key assigned to "RE" of the musical scale, the key input portion 2 and the LCD portion 3 light in blue. When the pressed key is a key assigned to "MI" of the musical scale, the key input portion 2 and the LCD portion 3 light in yellow. Thereafter, the CPU 15 executes the process of the ringing tone composing function (at step S15). On the other hand, when the ringing tone composing function has not been designated to "color lighting on" at step S13 (namely, the determined result at step S13 is N), the flow advances to step S15 (ringing tone composing process) skipping step S14 (color lighting process).

Fifth Embodiment

Next, the fifth embodiment of the present invention will be explained. The fifth embodiment is an operation of the function setup. The function setup is a function that distinguishes a completion screen, a non-completion screen, and a scroll screen (selection screen). The completion screen is displayed when a particular function that is set with reference to information displayed on the LCD portion 3 has been completed. The non-completion screen is displayed when a particular function that is set with reference to information displayed on the LCD portion 3 has not been completed. The scroll screen is displayed when the screen is scrolled to select one of a plurality of items.

The CPU 15 checks for a key that has been pressed (at step S12). When the pressed key is a key assigned to the function setup, the CPU 15 references the storing portion 12 and determines whether or not the function setup has been designated to "color lighting on". According to the fifth embodiment, since the function setup has been designated to "color lighting on" (namely, the determined result at step S16 is Yes), the CPU 15 references the color storing portion 13. The color storing portion 13 has stored information that causes the completion screen to light in green, the non-completion screen to light in orange, and the scroll screen (selection screen) to light in blue (see FIG. 4). Thus, when the screen displayed on the LCD portion 3 is the completion screen, the CPU 15 causes the multi-color lighting portion 14 to light in green. When the screen displayed on the LCD portion 3 is the non-completion screen, the CPU 15 causes the multicolor lighting portion 14 to light in orange. When the screen displayed on the LCD portion 3 is the scroll screen (selection screen), the CPU 15 causes the multi-color lighting portion 14 to light in blue (at step S17). As a result, when the screen displayed on the LCD portion 3 is the completion screen, the key input portion 2 and the LCD portion 3 light in green. When the screen displayed on the LCD portion 3 is the non-completion screen, the key input portion 2 and the LCD portion 3 light in orange. When the screen displayed on the LCD portion 3 is the scroll screen (selection screen), the key input portion 2 and the LCD portion 3 light in blue. Thereafter, the CPU 15 executes the function setup process (at step S18). On the other hand, when the function setup has not been designated to "color lighting on" (namely, the determined result at step S16 is N), the flow advances to step S18 (function setup process) skipping step S17 (color lighting process).

Sixth Embodiment

Next, the sixth embodiment will be explained. The six embodiment is an operation of a schedule function. The schedule function is a function for storing and processing many kinds of date and time information.

The CPU 15 checks for a key that has been pressed (at step S12). When the pressed key is a key assigned to the schedule function, the CPU 15 references the storing portion 12 and determines whether or not the schedule function has been designated to "color lighting one". According to the sixth embodiment, the schedule function has been designated to "color lighting on" (namely, the determined result at step S19 is Y). On the other hand, with reference to FIG. 4, the storing portion 12 has stored information for assigning "December 1 to December 2" to period 1 and "January 1 to February 2" to period 2. The color storing portion 13 has stored information that causes the multi-color lighting portion 14 to light in blue for period 1 and in red for period 2 for period 2.

When period 1 has been selected for the schedule function, the CPU 15 references the storing portion 12 and determines whether or not period 1 has been stored for the schedule function. Since the storing portion 12 has stored period 1 for the schedule function, the CPU 15 reads color information correlated with period 1 for the schedule function from the color storing portion 13. The color storing portion 13 has stored information that causes the multi-color lighting portion 14 to light in blue for period 1 (see FIG. 4). Thus, the CPU 15 causes the multi-color lighting portion 14 to light in blue (at step S20). As a result, the key input portion 2 and the LCD portion 3 light in blue. Likewise, when period 2 has been selected for the schedule function, the CPU 15 causes the multi-color lighting portion 14 to light in red (at step S20). Thereafter, the CPU 15 executes the schedule process (at step S21). On the other hand, when the schedule function has not been designated to "color lighting on" at step S19 (namely, the determined result at step S19 is N), the flow advances to step S21 (schedule process) skipping step S20 (color lighting process).

Seventh Embodiment

Next, the seventh embodiment of the present invention will be explained. The seventh embodiment is an operation of an anniversary function. The anniversary function is a function for storing and processing many kinds of information of a date that the user designates.

The CPU 15 checks for a key that has been pressed (at step S12). When the pressed key is a key assigned to the anniversary function, the CPU 15 references the storing portion 12 and determines whether or not the anniversary function has been designated to "color lighting on". According to the seventh embodiment, the anniversary function has been designated to "color lighting on" (namely, the determined result at step S22 is Y). On the other hand, with reference to FIG. 4, the storing portion 12 has stored information for assigning "December 24" to anniversary 1 and "January 1" to anniversary 2 for the anniversary function. The color storing portion 13 has stored information that causes the multi-color lighting portion 14 to light in white for anniversary 1 and in red for anniversary 2 for the anniversary function.

When anniversary 1 has been selected for the anniversary function, the CPU 15 references the storing portion 12 and determines whether or not anniversary 1 has been stored for the anniversary function. Since the storing portion 12 has stored anniversary 1 for the anniversary function, the CPU 15 reads color information correlated with anniversary 1 for the anniversary function from the color storing portion 13. The color storing portion 13 has stored information that causes multi-color lighting portion 14 to light in white for anniversary 1 (see FIG. 4). Thus, the CPU 15 causes the multi-color lighting portion 14 to light in white (at step S23). As a result, the key input portion 2 and the LCD portion 3 light in white. Likewise, when anniversary 2 has been selected for the anniversary function, the CPU 15 causes the multi-color lighting portion 14 to light in red (at step S23). Thereafter, the CPU 15 executes the anniversary process (at step S24). On the other hand, when the anniversary function has not been designated to "color lighting on" at step S22 (namely, the determined result at step S22 is N), the flow advances to step S24 (anniversary function) skipping step S23 (color lighting process).

Eighth Embodiment

Next, the eighth embodiment of the present invention will be explained. The eighth embodiment is an operation of a calendar function. The calendar function is a function for storing and processing many kinds of information of a date that the user designates.

The CPU 15 checks for a key that has been pressed (at step S12). When the pressed key is a key assigned to the calendar function, the CPU 15 references the storing portion 12 and determines whether or not the calendar function has been designated to "color lighting on". According to the eighth embodiment, the calendar function has been designated to "color lighting on" (namely, the determined result at step S25 is Y). On the other hand, with reference to FIG. 4, the storing portion 12 has stored information for assigning "December 1" to calendar 1, "December 2" to calendar 2, "December 3" to calendar 3, . . . and "December 31" to calendar 31. The color storing portion 13 has stored information that causes the multi-color lighting portion 14 to light in red for day 1, in yellow for day 2, in blue for day 3, . . . and in non-color for day 31.

When calendar 1 has been selected for the calendar function (for example, the cursor is placed at a character position of calendar 1 ("December 1") on the LCD portion 3), the CPU 15 references the storing portion 12 and determines whether or not calendar 1 has been stored for the calendar function. Since the storing portion 12 has stored calendar 1 for the calendar function, the CPU 15 reads color information correlated with calendar 1 for the calendar function from the color storing portion 13. The color storing portion 13 has stored information that causes the multi-color lighting portion 14 to light in red for calendar 1 ("day 1") (see FIG. 4). Thus, the CPU 15 causes the multi-color lighting portion 14 to light in red (at step S26). As a result, the key input portion 2 and the LCD portion 3 light in red. Likewise, when calendar 2 has been selected for the calendar function, the CPU 15 causes the multi-color lighting portion 14 to light in yellow. When calendar 3 has been selected, the CPU 15 causes the multi-color lighting portion 14 to light in blue. When calendar 31 has been selected, the CPU 15 causes the multi-color lighting portion 14 to light in non-color (at step S26). Thereafter, the CPU 15 executes the calendar process (at step S27). On the other hand, when the calendar function has not been designated to "color lighting on" (namely, the determined result at step S25 is N), the flow advances to step S27 (calendar process) skipping step S26 (color lighting process).

Ninth to Thirteenth Embodiments of Present Invention

Figure 7:
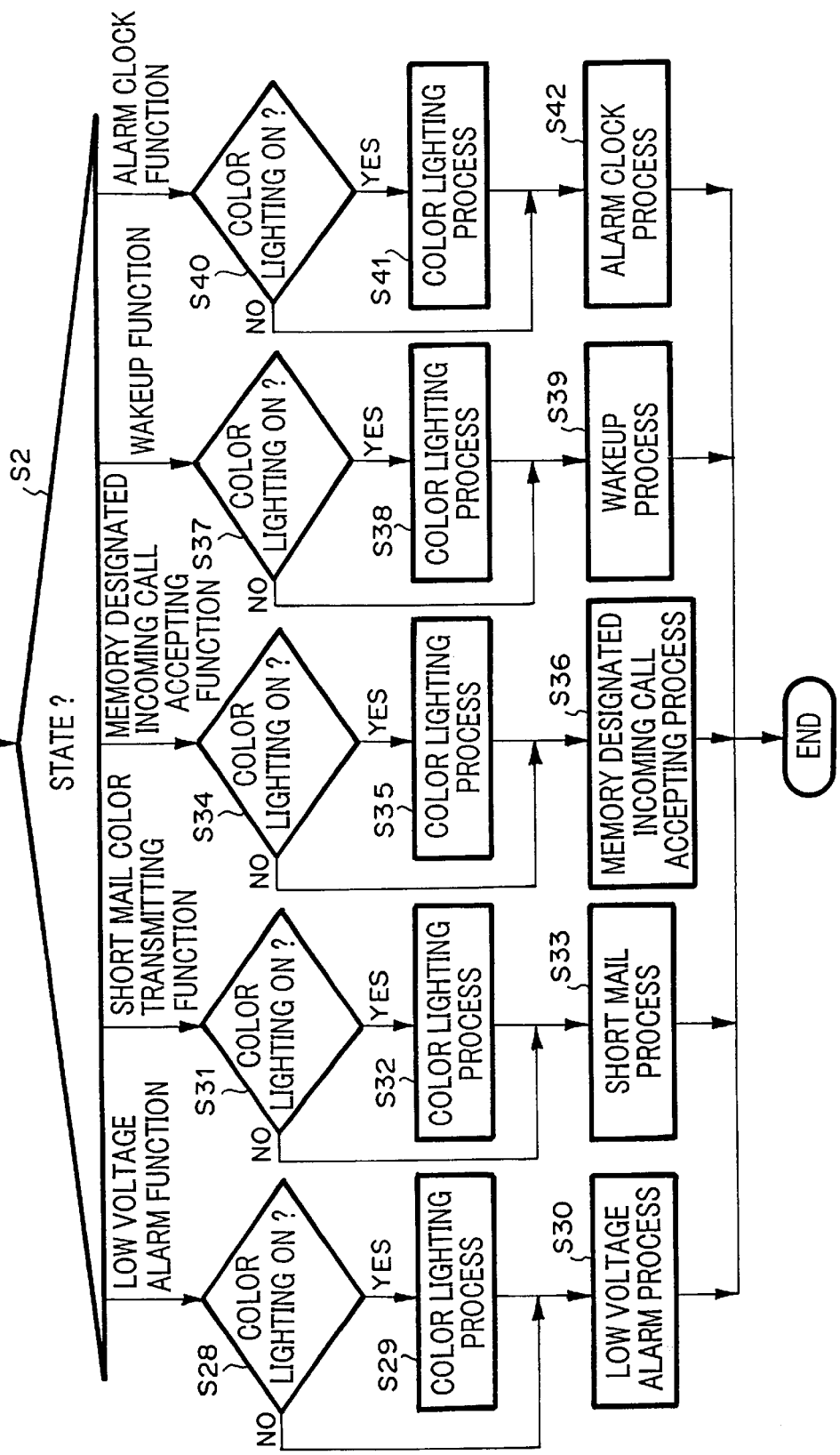
FIG. 7 is a flow chart showing operations of ninth to thirteenth embodiments of the present invention.

Next, the ninth to thirteenth embodiments of the present invention will be explained. The ninth to thirteenth embodiments are operations of the CPU 15 in the case that any key has not been pressed with the key input portion 2 at step S1 (namely, the determined result at step S1 is N). FIG. 7 is a flow chart showing the operations of the ninth to thirteenth embodiments.

Ninth Embodiment

Next, the ninth embodiment of the present invention will be explained. The ninth embodiment is an operation of a low voltage alarm function. The low voltage alarm function is a function for storing and processing many kinds of information in the low voltage state.

Referring to FIG. 7, when the CPU 15 knows that the power voltage of the portable telephone unit 1 does not satisfy a predetermined criterion (namely, detects a low voltage alarm) (at step S2), the CPU 15 references the storing portion 12 and determines whether or not the lower voltage alarm function has been designated to "color lighting on". According to the ninth embodiment, the low voltage alarm function has been designated to "color lighting on" (namely, the determined result at step S28 is Y). On the other hand, the storing portion 12 has stored information about the low voltage alarm function. The color storing portion 13 has stored information that causes the multi-color lighting portion 14 to light in red for the low voltage alarm function.

When the CPU 15 knows that the storing portion 12 has stored information about the low voltage alarm function, the CPU 15 reads information that causes the multi-color lighting portion 14 to light in red for the low voltage alarm function. Thus, the CPU 15 causes the multi-color lighting portion 14 to light in red (at step S29). As a result, the key input portion 2 and the LCD portion 3 light in red. Therefore, the CPU 15 executes the low voltage alarm process (at step S30). On the other hand, when the low voltage alarm function has not been designated to "color lighting on" at step S28 (namely, the determined result at step at step S28 is N), the flow advances to step S30 (low voltage alarm process) skipping step S29 (color lighting process).

Tenth Embodiment

Next, the tenth embodiment of the present invention will be explained. The tenth embodiment is an operation of a short mail color transmitting function. The short mail color transmitting function is a function for storing and processing many kinds of information of a short mail.

When the CPU 15 has determined that the current state is the short mail color transmitting function (at step S2), the CPU 15 references the storing portion 12 and determines whether or not the short mail color transmitting function has been designated to "color lighting on". According to the tenth embodiment, the short mail color transmitting function has been designated to "color lighting on" (namely, the determined result at step S31 is Y). On the other hand, the storing portion 12 has a storage area for the transmission short mail. In addition, the color storing portion 13 has stored information that causes the multi-color lighting portion 14 to light in blue for the short mail color transmitting function. When the CPU 15 has determined that the storing portion 12 had stored the transmission short mail and a mail message had been opened, the CPU 15 causes the multi-color lighting portion 14 to light in blue (at step S32). Thus, the key input portion 2 and the LCD portion 3 light in blue. Thereafter, the CPU 15 executes the short mail process (at step S33). On the other hand, when the short mail color transmitting function has not been designated to "color lighting on" (namely, the determined result at step S31 is N), the flow advances to step S33 (short mail process) skipping step S32 (color lighting process).

Eleventh Embodiment

Next, the eleventh embodiment of the present invention will be explained. The eleventh embodiment is an operation of a memory designated incoming call accepting function. The memory designated incoming call accepting function is a function for storing and processing many kinds of information of incoming calls.

When the CPU 15 has determined that the current state is the memory designated incoming call accepting function (at step S2), the CPU 15 references the storing portion 12 and determines whether or not the memory designated incoming call accepting function has been designated to "color lighting on". According to the eleventh embodiment, the memory designated incoming call accepting function has been designated to "color lighting on" (namely, the determined result at step S34 is Y). On the other hand, the storing portion 12 has stored identification information of predetermined telephone numbers and so forth. The color storing portion 13 has stored color information correlated with the identification information. In other words, when the color storing portion 13 has stored information "yellow" in memory address 01 and the CPU 15 has determined that a call is being received from a telephone number stored in memory address 01, the CPU 15 causes the multi-color lighting portion 14 to light in yellow (at step S35). As a result, the key input portion 2 and the LCD portion 3 light in yellow. Thereafter, the CPU 15 executes the memory designated incoming call accepting process (at step S36). On the other hand, when the memory designated incoming call accepting function has not been designated to "call lighting on" at step S34 (namely, the determined result at step S34 is N), the flow advances to step S36 (memory designated incoming call accepting process) skipping step S35 (color lighting process).

Twelfth Embodiment

Next, the twelfth embodiment of the present invention will be explained. The twelfth embodiment is an operation of a wakeup function. The wakeup function is a function for storing and processing many kinds of information in the event that the power of the portable telephone unit is turned on.

When the CPU 15 has determined that the current state is the wakeup function (at step S2), the CPU 15 references the storing portion 12 and determines whether or not the wakeup function has been designated to "color lighting on". According to the twelfth embodiment, the wakeup function has been designated to "color lighting on" (namely, the determined result at step S37 is Y). On the other hand, the storing portion 12 has stored information about the wakeup function. The color storing portion 13 has stored color information about the wakeup function. Now, it is assumed that the storing portion 12 has stored information about the wakeup function and the color storing portion 13 has stored information "blue". In this case, the CPU 15 executes the multi-color lighting portion 14 to light in blue (at step S38). Thus, the key input portion 2 and the LCD portion 3 light in blue. Thereafter, the CPU 15 executes the wakeup process (at step S39). On the other hand, when the wakeup function has not been designated to "color lighting on" (namely, the determined result at step S37 is N), the flow advances to step S39 (wakeup process) skipping step S38 (color lighting process).

Thirteenth Embodiment

Next, the thirteenth embodiment of the present invention will be explained. The thirteenth embodiment is an operation of an alarm clock function. The alarm clock function is a function for storing and processing many kinds of information of time.

When the CPU 15 has determined that the current state is the alarm clock function (at step S2), the CPU 15 references the storing portion 12 and determines whether or not the alarm clock function has been designated to "color lighting on". According to the thirteenth embodiment, the alarm clock function has been designated to "color lighting on" (namely, the determined result at step S40 is Y). On the other hand, the storing portion 12 has stored time information of an alarm clock (for example, time information "pm 1"). The color storing portion 13 has stored information "orange" as the color information correlated with the time information. The CPU 15 reads the time information "pm 1" and the color information "orange" correlated with the time information from the color storing portion 13. At pm 1, the CPU 15 causes the multi-color lighting portion 14 to light in orange (at step S41). Thus, the key input portion 2 and the LCD portion 3 light in orange. Thereafter, the CPU 15 executes the alarm clock process (at step S42). On the other hand, when the alarm clock function has not been designated to "color lighting on" at step S40 (namely, the determined result at step S40 is N), the flow advances to step S42 (alarm clock process) skipping step S41 (color lighting process).

A first aspect of the present invention is a display lighting apparatus, comprising a first storing means for storing date information, a second storing means for storing color information correlated with the date information, a displaying means for displaying information, a lighting means for lighting said displaying means, and a controlling means for searching said first storing means for input date information, and when desired date information is obtained, reading color information correlated with the date information from said second storing means, and causing said lighting means to light corresponding to the color information.

In other words, the conventional drawback of which characters on the display and keys are small and illegible can be solved. In addition, a key operation can be suppressed from being mistakenly performed.

A second aspect of the present invention is a display lighting apparatus, comprising a first storing means for storing key operation information, a second storing means for storing color information correlated with the key operation information, a displaying means for displaying information, a lighting means for lighting said displaying means, and a controlling means for searching said first storing means for input key operation information, and when desired key operation information is obtained, reading color information correlated with the key operation information from said second storing means, and causing said lighting means to light corresponding to the color information. Thus, the same effect as the first aspect of the present invention can be accomplished.

A third aspect of the present invention is a display lighting apparatus, comprising a first storing means for storing screen information, a second storing means for storing color information correlated with the screen information, a displaying means for displaying information, a lighting means for lighting said displaying means, and a controlling means for searching said first storing means for screen information displayed on said displaying means, and when desired screen information is obtained, reading color information correlated with the screen information from said second storing means, and causing said lighting means to light corresponding to the color information. Thus, the same effect as the first aspect of the present invention can be accomplished.

A fourth aspect of the present invention is a display lighting apparatus, comprising a first storing means for storing predetermined reception information, a second storing means for storing color information correlated with the reception information, a displaying means for displaying information, a lighting means for lighting said displaying means, and a controlling means for searching said first storing means for reception information, and when desired reception information is obtained, reading color information correlated with the reception information from said second storing means, and causing said lighting means to light corresponding to the color information. Thus, the same effect as the first aspect of the present invention can be accomplished.

A fifth aspect of the present invention is a display lighting method of a display lighting apparatus having a first storing means for storing date information, a second storing means for storing color information correlated with the date information, a displaying means for displaying information, and a lighting means for lighting the displaying means, the method comprising the steps of searching the first storing means for input date information, and when desired date information is obtained, reading color information correlated with the date information from the second storing means, and causing the lighting means to light corresponding to the color information. Thus, the same effect as the first aspect of the present invention can be accomplished.

A sixth aspect of the present invention is a display lighting method of a display lighting apparatus having a first storing means for storing key operation information, a second storing means for storing color information correlated with the key operation information, a displaying means for displaying information, and a lighting means for lighting the displaying means, the method comprising the steps of searching the first storing means for input key operation information, and when desired key operation information is obtained, reading color information correlated with the key operation information from the second storing means, and causing the lighting means to light corresponding to the color information. Thus, the same effect as the first aspect of the present invention can be accomplished.

A seventh aspect of the present invention is a display lighting method of a display lighting apparatus having a first storing means for storing screen information, a second storing means for storing color information correlated with the screen information, a displaying means for displaying information, and a lighting means for lighting the displaying means, the method comprising the steps of searching the first storing means for screen information displayed on the displaying means, and when desired screen information is obtained, reading color information correlated with the screen information from the second storing means, and causing the lighting means to light corresponding to the color information. Thus, the same effect as the first aspect of the present invention can be accomplished.

An eighth aspect of the present invention is a display lighting method of a display lighting apparatus having a first storing means for storing predetermined reception information, a second storing means for storing color information correlated with the reception information, a displaying means for displaying information, and a lighting means for lighting the displaying means, the method comprising the steps of searching the first storing means for reception information, and when desired reception information is obtained, reading color information correlated with the reception information from the second storing means, and causing the lighting means to light corresponding to the color information. Thus, the same effect as the first aspect of the present invention can be accomplished.

Although the present invention has been shown and explained with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A display lighting apparatus, comprising:
   first storing means for storing date information including a first date and a second date;
   second storing means for storing color information correlated with the date information, wherein said color information correlates said first date with a first color and a second date with a second color;
   displaying means for displaying information;
   lighting means for lighting said displaying means; and
   controlling means for searching said first storing means for input date information, and when desired date information is obtained, reading color information correlated with the date information from said second storing means, and causing said lighting means to light corresponding to the color information.

2. The display lighting apparatus as set forth in claim 1, wherein the date information comprises information that represents a period.

3. The display lighting apparatus as set forth in claim 1, wherein the date information comprises information that represents a predetermined day.

4. The display lighting apparatus as set forth in claim 1, wherein the date information comprises information that represents dates of one month.

5. The display lighting apparatus as set forth in claim 1, wherein the date information comprises wakeup information.

6. The display lighting apparatus as set forth in claim 1, wherein the date information comprises time information of an alarm clock.

7. A display lighting apparatus, comprising:
   first storing means for storing key operation information and corresponding musical note information including a first key operation corresponding to a first musical note and a second key operation corresponding to a second musical note;
   second storing means for storing color information correlated with the key operation information and said corresponding musical note information, wherein said color information correlates said first key operation with a first color and said second key operation with a second color;
   displaying means for displaying information;
   lighting means for lighting said displaying means; and
   controlling means for searching said first storing means for input key operation information, and when desired key operation information is obtained, reading color information correlated with the key operation information from said second storing means, and causing said lighting means to light corresponding to the color information.

8. The display lighting apparatus as set forth in claim 7, wherein the key operation information comprises information that correlates keys and musical scales.

9. A display lighting apparatus, comprising:
   first storing means for storing screen function information including a first screen function and a second screen function;
   second storing means for storing color information correlated with the screen function information, wherein said color information correlates said first screen function with a first color and said second screen function with a second color;
   displaying means for displaying information;
   lighting means for lighting said displaying means; and
   controlling means for searching said first storing means for screen information displayed on said displaying means, and when desired screen information is obtained, reading color information correlated with the screen information from said second storing means, and causing said lighting means to light corresponding to the color information.

10. The display lighting apparatus as set forth in claim 9, wherein the screen information comprises a completion screen that represents that the setup of a desired function has been completed.

11. The display lighting apparatus as set forth in claim 9, wherein the screen information comprises a non-completion screen that represents that the setup of a desired function has not been completed.

12. The display lighting apparatus as set forth in claim 9, wherein the screen information comprises a scroll screen that allows one of a plurality of items to be selected.

13. A display lighting apparatus, comprising:
   first storing means for storing predetermined reception information including a first mail and a second mail;
   second storing means for storing color information correlated with the reception information, wherein said color information correlates said first mail with a first color and a said second mail with a second color;
   displaying means for displaying information;
   lighting means for lighting said displaying means; and
   controlling means for searching said first storing means for reception information, and when desired reception information is obtained, reading color information correlated with the reception information from said second storing means, and causing said lighting means to light corresponding to the color information.

14. The display lighting apparatus as set forth in claim 13, wherein the reception information comprises of a short mail information.

15. A display lighting method of a display lighting apparatus including:
   first storing means for storing date information including a first date and a second date,
   second storing means for storing color information correlated with the date information, wherein said color information correlates said first date with a first color and a said second date with a second color,
   displaying means for displaying information, and
   lighting means for lighting the displaying means, the method comprising:
   searching the first storing means for input date information;
   when desired date information is obtained, reading color information correlated with the date information from the second storing means; and causing the lighting means to light corresponding to the color information.

16. The display lighting method as set forth in claim 15, wherein the date information comprises information that represents a period.

17. The display lighting method as set forth in claim 15, wherein the date information comprises information that represents a predetermined day.

18. The display lighting method as set forth in claim 15, wherein the date information comprises information that represents dates of one month.

19. The display lighting method as set forth in claim 15, wherein the date information comprises wakeup information.

20. The display lighting method as set forth in claim 15, wherein the date information comprises timer information of an alarm clock.

21. A display lighting method of a display lighting apparatus including:

first storing means for storing key operation information and corresponding musical note information including a first key operation corresponding to a first musical note and a second key operation corresponding to a second musical note, second storing means for storing color information correlated with the key operation information and said corresponding musical note information, wherein said color information correlates said first key operation with a first color and said second key operation with a second color, displaying means for displaying information, and lighting means for lighting the displaying means, the method comprising:

searching the first storing means for input key operation information;

when desired key operation information is obtained, reading color information correlated with the key operation formation from the second storing means; and causing the lighting means to light corresponding to the color information.

22. The display lighting method as set forth in claim 21, wherein the key operation information comprises information that correlates keys and musical scales.

23. A display lighting method of a display lighting apparatus including:

first storing means for storing screen function information including a first screen function and a second screen function, second storing means for storing color information correlated with the screen function information, wherein said color information correlates said first screen function with a first color and said second screen function with a second color, displaying means for displaying information, and lighting means for lighting the displaying means, the method comprising:

searching the first storing means for screen information displayed on the displaying means;

when desired screen information is obtained, reading color information correlated with the screen information from the second storing means; and causing the lighting means to light corresponding to the color information.

24. The display lighting method as set forth in claim 23, wherein the screen information comprises a completion screen that represents that the setup of a desired function has been completed.

25. The display lighting method as set forth in claim 23, wherein the screen information comprises a non-completion screen that represents that the setup of a desired function has not been completed.

26. The display lighting method as set forth in claim 23, wherein the screen information comprises a scroll screen that allows one of a plurality of items to be selected.

27. A display lighting method of a display lighting apparatus including:

first storing means for storing predetermined reception information including a first mail and a second mail, second storing means for storing color information correlated with the reception information, wherein said color information correlates said first mail with a first color and said second mail with a second color, displaying means for displaying information, and lighting means for lighting the displaying means, the method comprising:

the first storing means for reception information;

when desired reception information is obtained, reading color information correlated with the reception information from the second storing means; and causing the lighting means to light corresponding to the color information.

28. The display lighting method as set forth in claim 27, wherein the reception information comprises a short mail information.

\* \* \* \* \*